(12) United States Patent
Kanazashi

(10) Patent No.: US 7,843,651 B2
(45) Date of Patent: Nov. 30, 2010

(54) WIDE-ANGLE LENS SYSTEM

(75) Inventor: Yasuo Kanazashi, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/538,282

(22) Filed: Aug. 10, 2009

(65) Prior Publication Data

US 2010/0033847 A1 Feb. 11, 2010

(30) Foreign Application Priority Data

Aug. 11, 2008 (JP) .............................. 2008-207276

(51) Int. Cl.
*G02B 13/04* (2006.01)
*G02B 9/12* (2006.01)

(52) U.S. Cl. ....................................... 359/750; 359/784

(58) Field of Classification Search ................. 359/713, 359/716, 749, 753, 784

See application file for complete search history.

(56) References Cited

U.S. PATENT DOCUMENTS

| | | | |
|---|---|---|---|
| 5,390,048 A * | 2/1995 | Miyatake et al. ............ | 359/650 |
| 5,805,349 A | 9/1998 | Sato | |
| 7,116,499 B2 | 10/2006 | Hirakawa | |
| 7,426,079 B2 | 9/2008 | Yokoyama | |
| 2005/0237627 A1 | 10/2005 | Hirakawa | |
| 2006/0126192 A1 | 6/2006 | Ryu et al. | |
| 2007/0014025 A1 | 1/2007 | Yokoyama | |
| 2007/0201140 A1 | 8/2007 | Kato | |
| 2007/0201141 A1 | 8/2007 | Kato et al. | |
| 2008/0106809 A1 | 5/2008 | Hirano | |

FOREIGN PATENT DOCUMENTS

| | | |
|---|---|---|
| JP | 9-113798 | 5/1997 |
| JP | 2005-316014 | 11/2005 |
| JP | 2006-301416 | 11/2006 |

OTHER PUBLICATIONS

English language Abstract of JP 9-113798, May 2, 1997.
English language Abstract of JP 2005-316014, Nov. 10, 2005.
English language Abstract of JP 2006-301416, Nov. 2, 2006.

* cited by examiner

*Primary Examiner*—William C Choi
(74) *Attorney, Agent, or Firm*—Greenblum & Bernstein P.L.C.

(57) ABSTRACT

A wide-angle lens system includes a negative first lens group, a negative second lens group and a positive third lens group, in this order from the object.

The first lens group includes a negative meniscus lens element having the convex surface facing toward the object, and a positive lens element having a convex surface facing toward the object, in this order from the object. The first lens group includes at least one aspherical surface.

The second lens group includes a negative meniscus lens element having the convex surface facing toward the object, and cemented lens elements having a positive lens element and a negative lens element, in this order from the object.

The third lens group includes cemented lens elements having a negative lens element and a positive lens element, and a positive lens element having a convex surface facing toward the image, in this order from the object.

7 Claims, 16 Drawing Sheets

FNo.=1:4.1

—— SA
-- SC

-0.5  0.5

SPHERICAL
ABERRATION

THE SINE
CONDITION

FNo.=1:4.1

—— d Line
······ g Line
--- C Line

-0.5  0.5

SPHERICAL
ABERRATION

CHROMATIC
ABERRATION

Y=14.24

-0.05  0.05

LATERAL
CHROMATIC
ABERRATION

Y=14.24

—— S
-- M

-0.5  0.5

ASTIGMATISM

Y=14.24

-5.0  5.0 %

DISTORTION

Fig.3
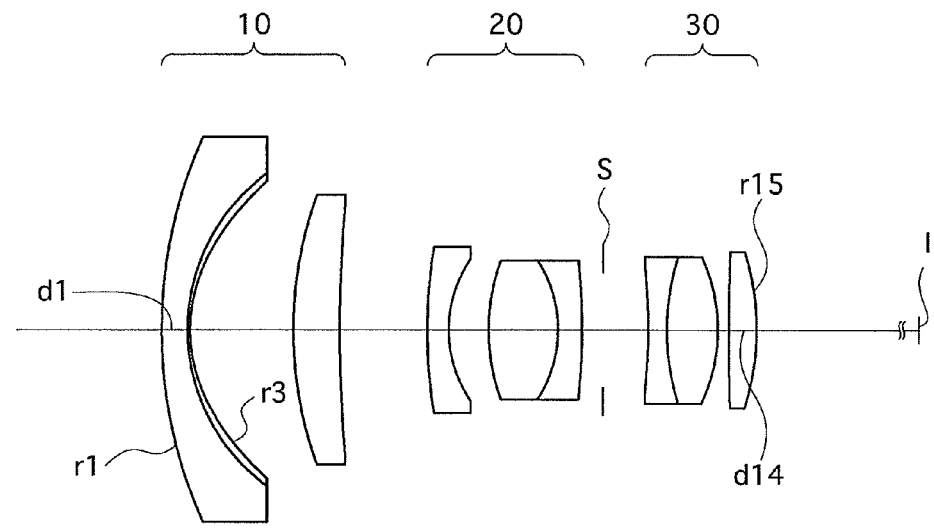
Fig.4A
FE:1:4.3
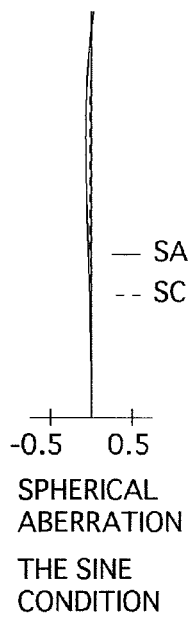
-0.5   0.5
SPHERICAL
ABERRATION
THE SINE
CONDITION
— SA
-- SC
Fig.4B
FE:1:4.3
-0.5   0.5
SPHERICAL
ABERRATION
CHROMATIC
ABERRATION
——— d Line
······· g Line
- - - C Line
Fig.4C
Y=14.24
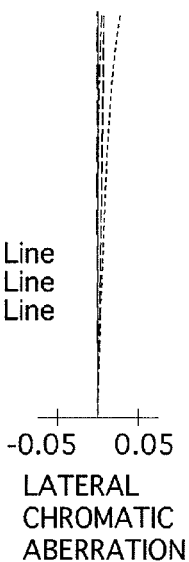
-0.05   0.05
LATERAL
CHROMATIC
ABERRATION
Fig.4D
Y=14.24
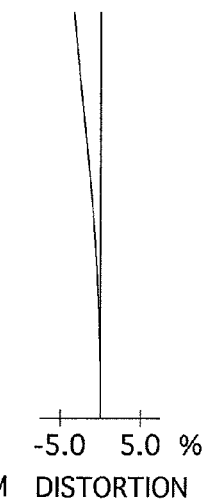
-0.5   0.5
ASTIGMATISM
— S
-- M
Fig.4E
Y=14.24
-5.0   5.0 %
DISTORTION FNo.=1:4.1
— SA
-- SC
-0.5  0.5
SPHERICAL
ABERRATION
THE SINE
CONDITION FNo.=1:4.1
—— d Line
----- g Line
---- C Line
-0.5  0.5
SPHERICAL
ABERRATION
CHROMATIC
ABERRATION

Y=14.24
-0.05  0.05
LATERAL
CHROMATIC
ABERRATION

Y=14.24
— S
-- M
-0.5  0.5
ASTIGMATISM

Y=14.24
-5.0  5.0 %
DISTORTION

Fig.7
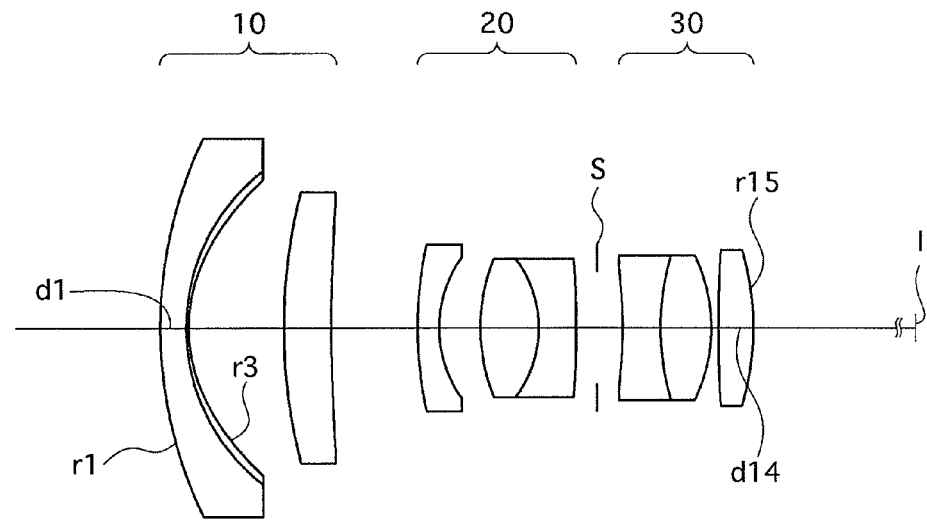
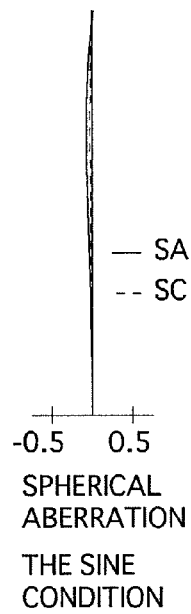
Fig.8A
FE:1:4.3
— SA
-- SC
-0.5   0.5
SPHERICAL
ABERRATION
THE SINE
CONDITION
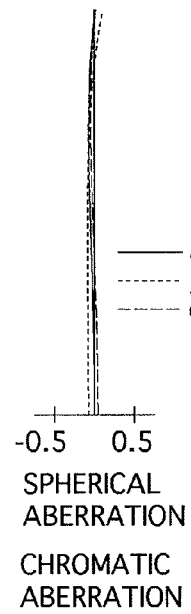
Fig.8B
FE:1:4.3
— d Line
······ g Line
---- C Line
-0.5   0.5
SPHERICAL
ABERRATION
CHROMATIC
ABERRATION
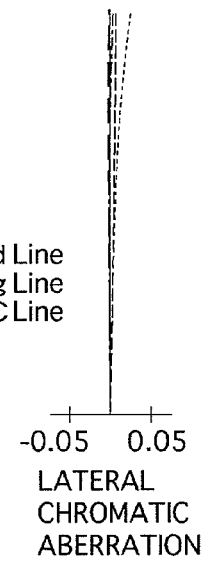
Fig.8C
Y=14.24
-0.05   0.05
LATERAL
CHROMATIC
ABERRATION
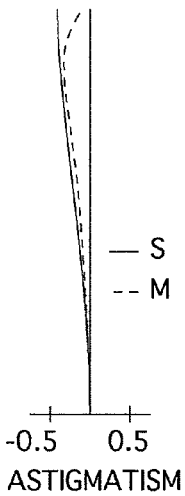
Fig.8D
Y=14.24
— S
-- M
-0.5   0.5
ASTIGMATISM
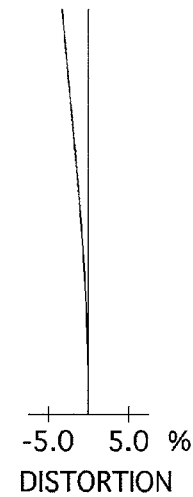
Fig.8E
Y=14.24
-5.0   5.0 %
DISTORTION Fig.9
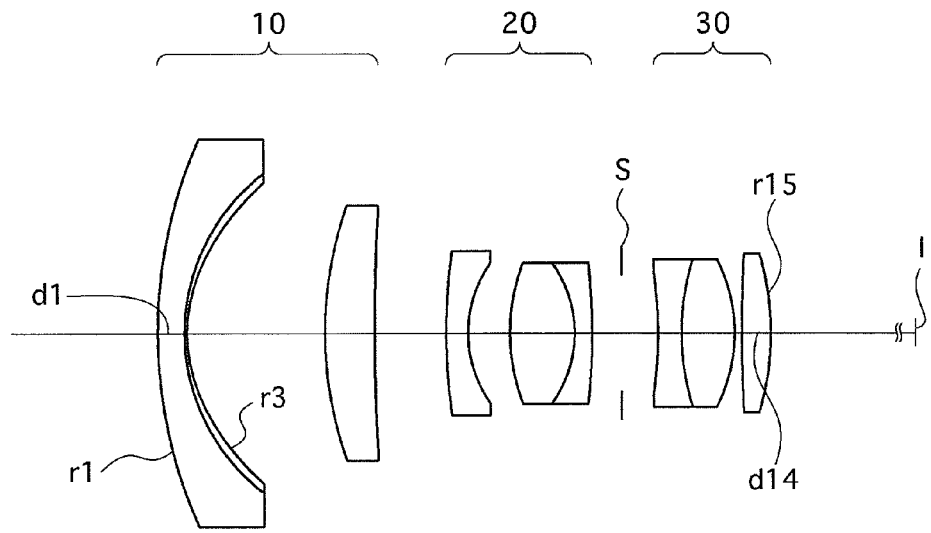
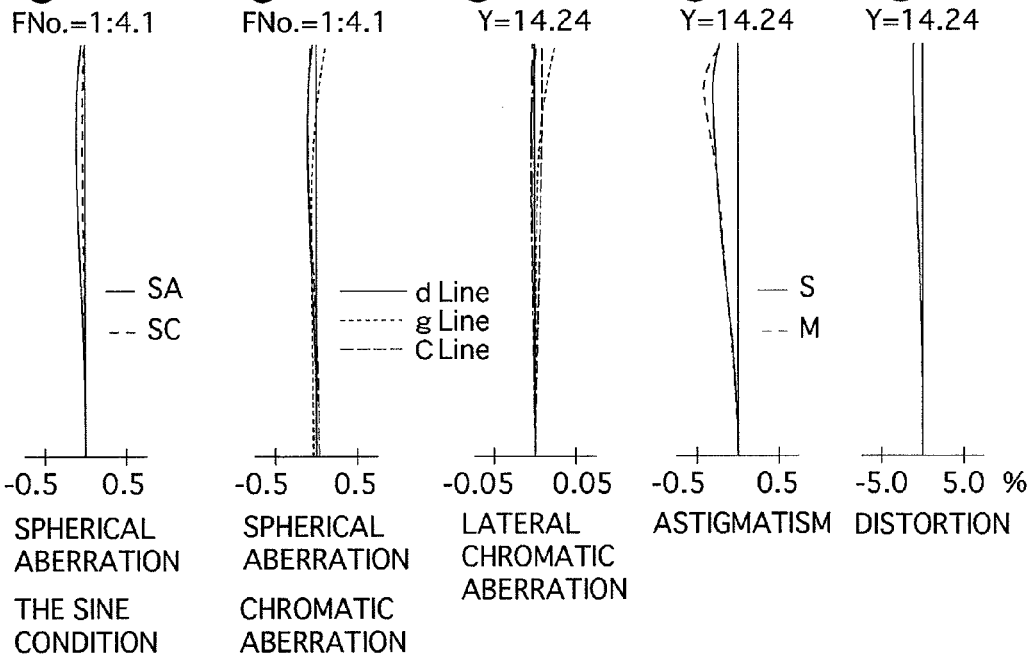
Fig.10A FNo.=1:4.1
Fig.10B FNo.=1:4.1
Fig.10C Y=14.24
Fig.10D Y=14.24
Fig.10E Y=14.24
— SA
-- SC
—— d Line
······ g Line
---- C Line
— S
-- M
-0.5  0.5
SPHERICAL ABERRATION
THE SINE CONDITION
-0.5  0.5
SPHERICAL ABERRATION
CHROMATIC ABERRATION
-0.05  0.05
LATERAL CHROMATIC ABERRATION
-0.5  0.5
ASTIGMATISM
-5.0  5.0 %
DISTORTION Fig.13
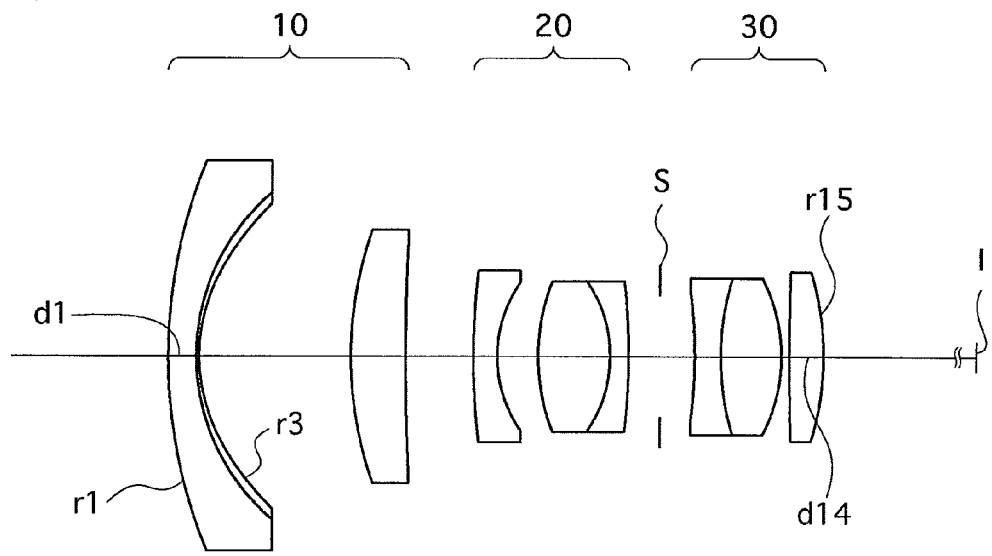
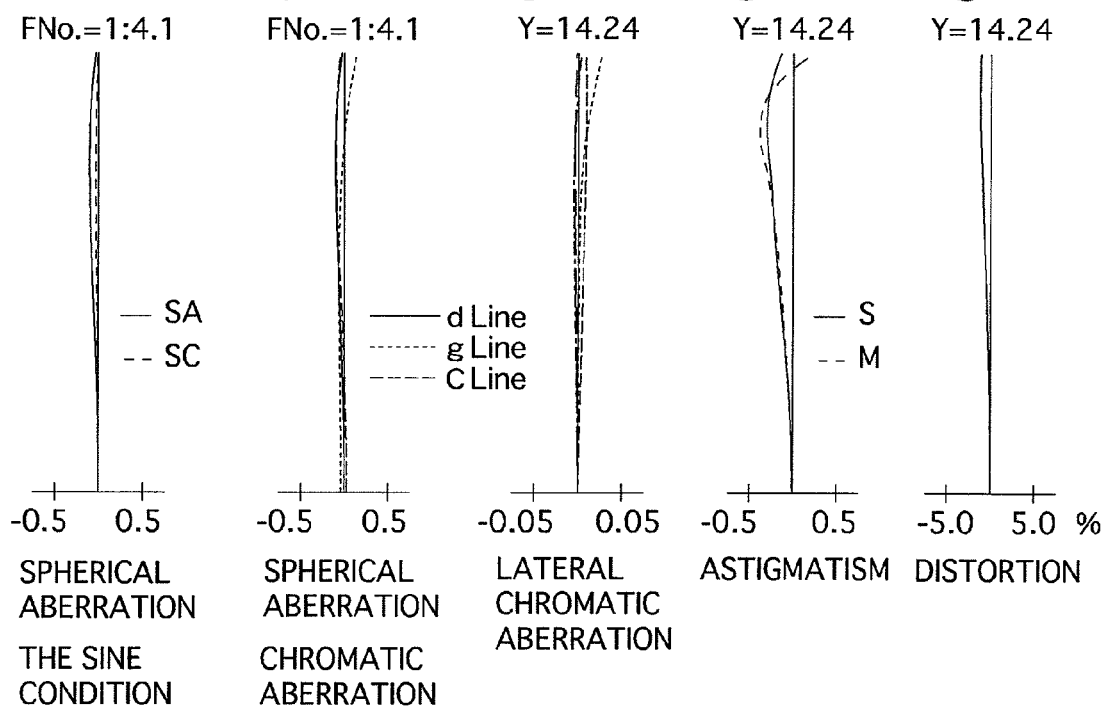
Fig.14A  Fig.14B  Fig.14C  Fig.14D  Fig.14E

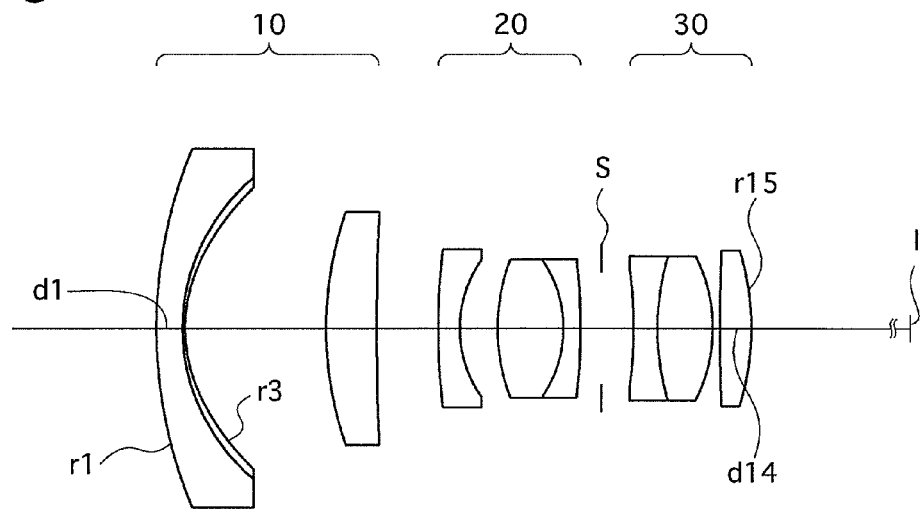
Fig.15
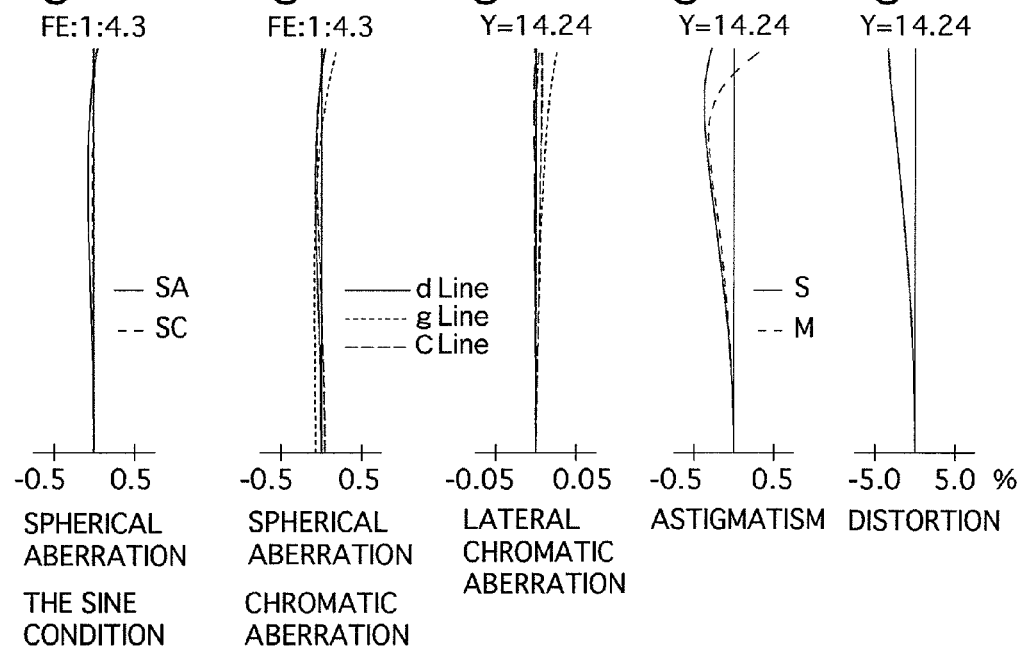

Fig.21
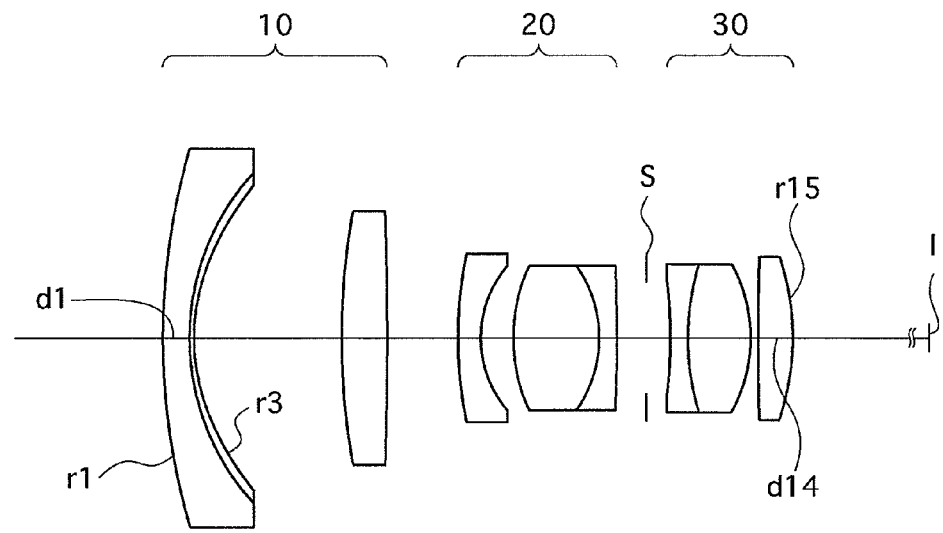
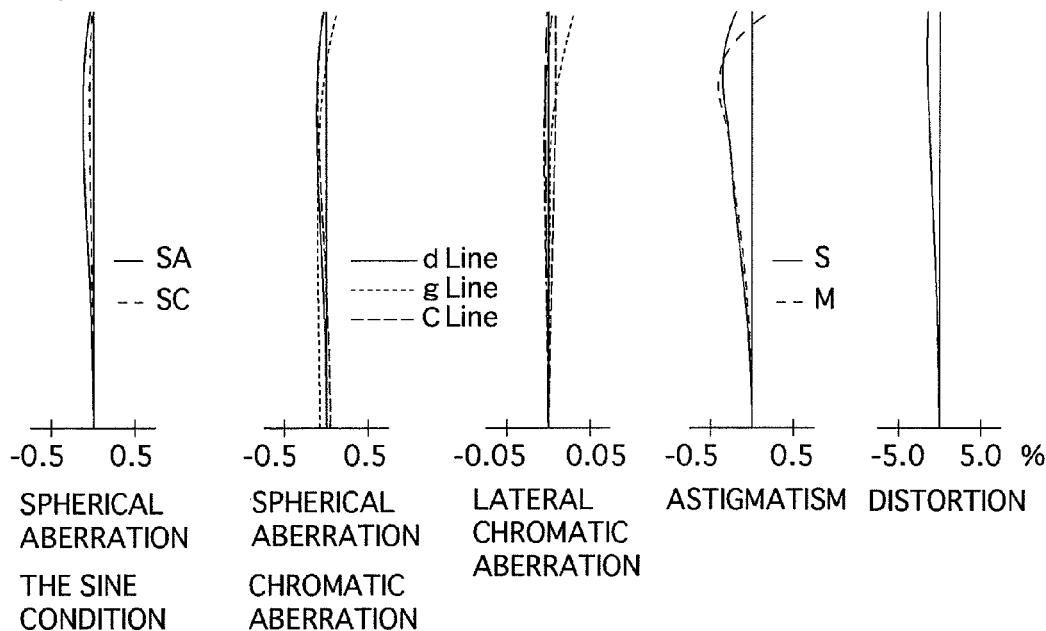

Fig.27
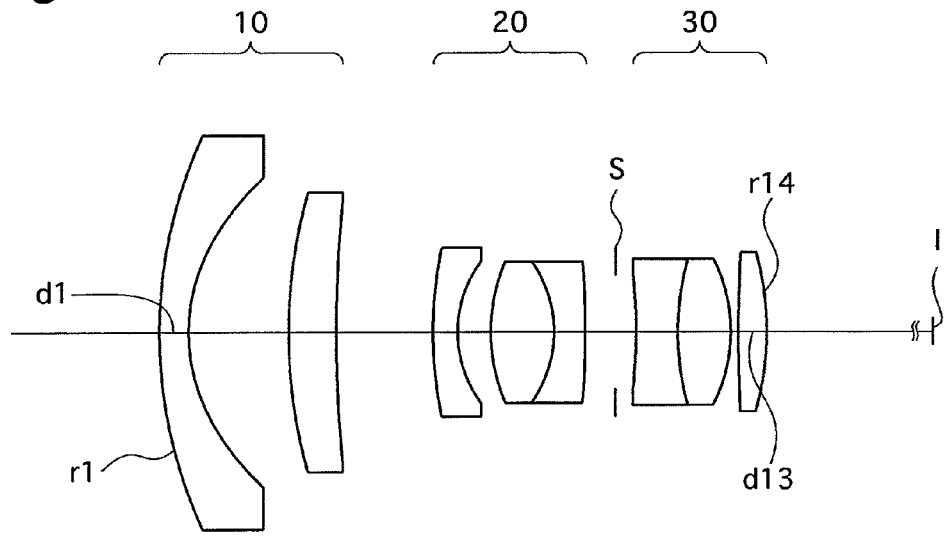
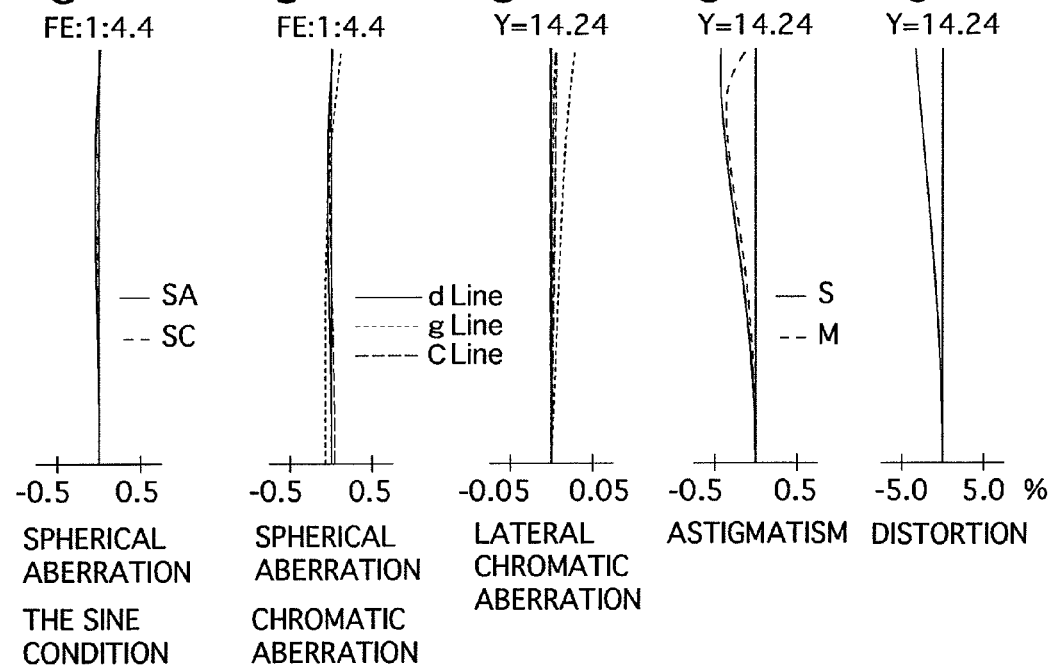
Fig.28A  Fig.28B  Fig.28C  Fig.28D  Fig.28E

Fig.29
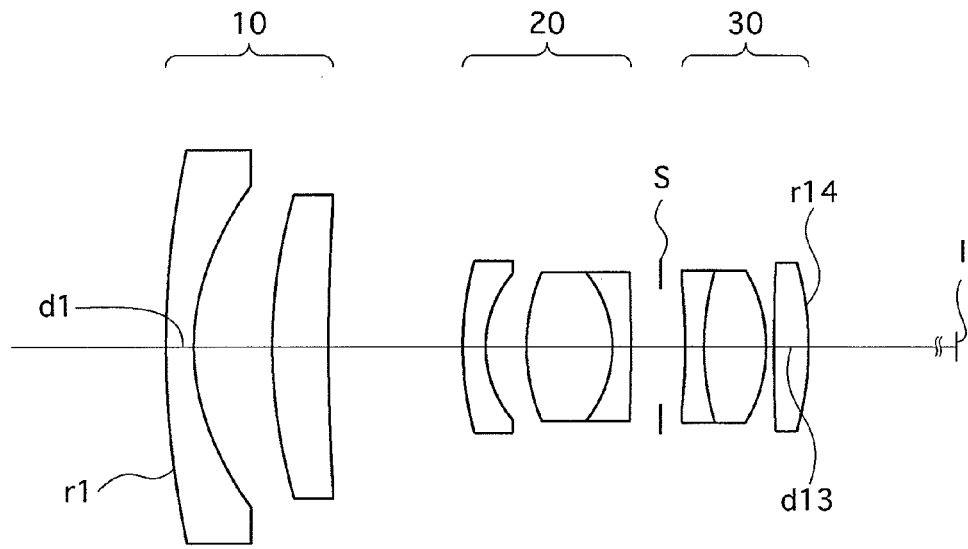
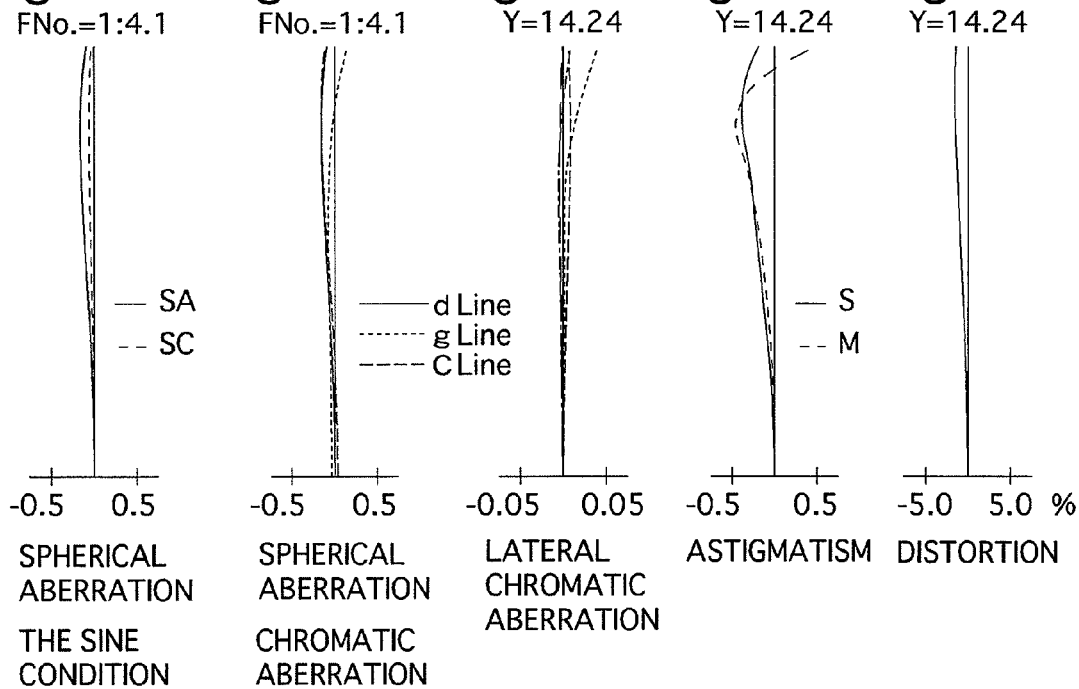

Fig.31
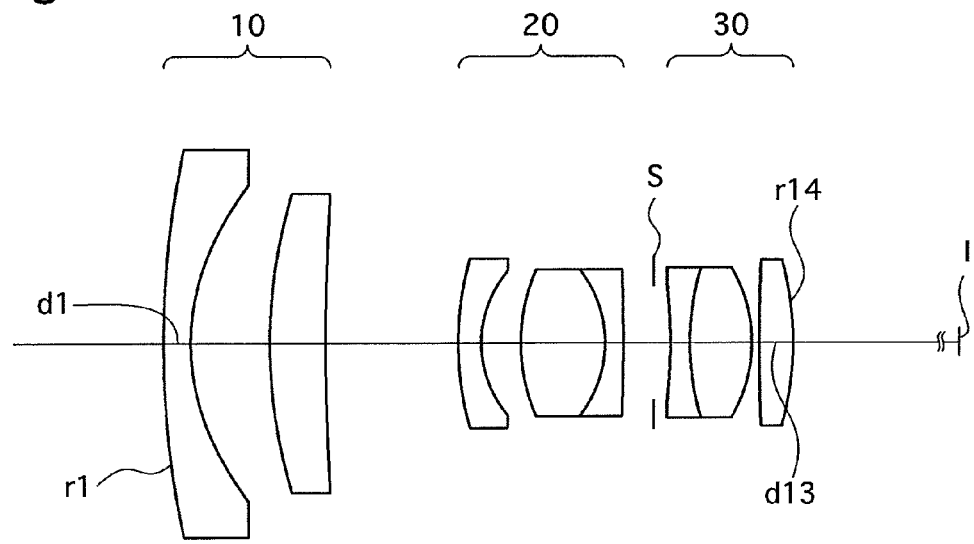
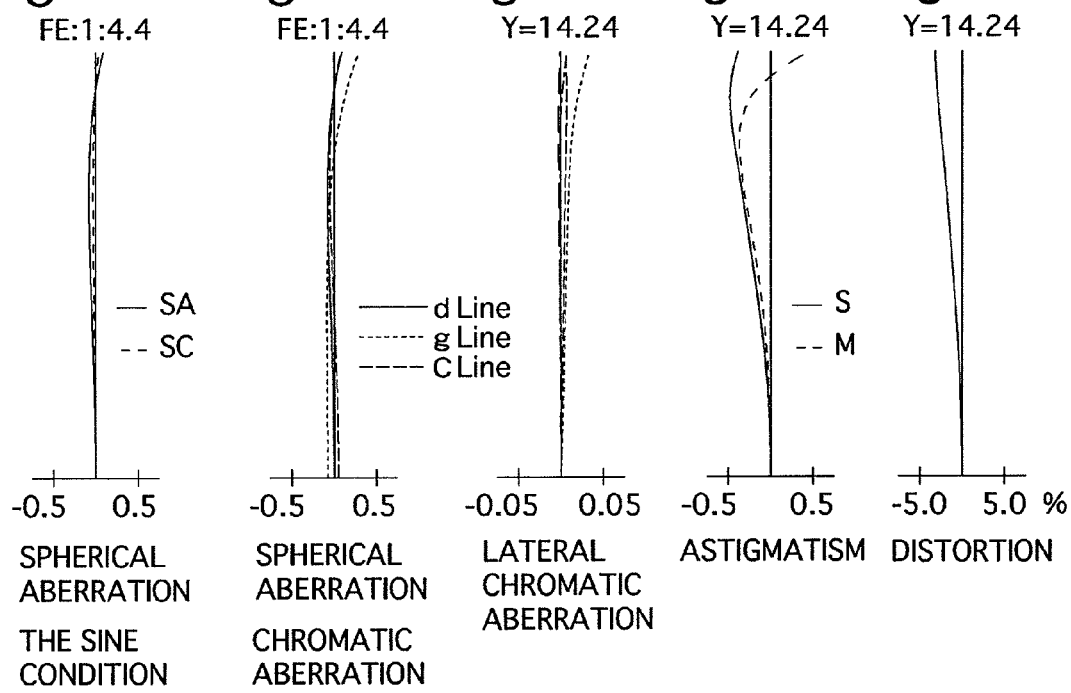
Fig.32A  Fig.32B  Fig.32C  Fig.32D  Fig.32E

WIDE-ANGLE LENS SYSTEM

BACKGROUND OF THE INVENTION

1. Field of the Invention

The present invention relates to a photographic lens system provided in a photographic camera (especially an SLR digital camera) or a video camera, and more specifically relates to a wide-angle lens system which can adequately correct aberrations while attaining a sufficiently long back focal distance.

2. Description of Related Art

In photographic cameras, electronic still cameras, and video cameras, etc., where a wide-angle lens system by which the focal length at the short focal length extremity can be shorter is employed, a retrofocus lens system in which a lens group having a negative refractive power (hereinafter, a negative lens group) and a lens group having a positive refractive power (hereinafter, a positive lens group) are provided in this order form the object is often used. This is because in the above cameras, there is a need to secure a predetermined distance between the most image-side lens surface and the imaging plane (i.e., the back focal distance).

Examples of related art wide-angle lens systems are taught in Japanese Unexamined Patent Publication Nos. H09-113798, 2005-316014, and 2006-301416.

A retrofocus lens system has an asymmetric lens arrangement with respect to the diaphragm, since a strongly negative lens group is provided in front (on the object side) of a master lens. Consequently, the correcting of aberrations, such as distortion and lateral chromatic aberration, occurred in the front lens group is difficult.

Specifically, in a lens system disclosed in Japanese Unexamined Patent Publication No. H09-113798, a high optical quality is achieved with respect to (the correcting of) aberrations; however, since refractive power is not suitably distributed to the most object-side lens group, the back focal distance cannot sufficiently be secured.

In a lens system disclosed in Japanese Unexamined Patent Publication No. 2005-316014, a glass material is not adequately selected, so that a large amount of flare caused by off-axis aberrations occurs; and refractive power is not suitably distributed over the lens groups, so that the entire length of the lens system disadvantageously becomes longer.

In a lens system disclosed in Japanese Unexamined Patent Publication No. 2006-301416, refractive power is not adequately distributed over the two lens groups on the object side from the diaphragm, so that off-axis aberrations, such as distortion and field curvature, largely occur. Furthermore, a glass material selected for lens elements to be cemented is inappropriate, so that lateral chromatic aberration and field curvature largely occur over the entire lens system.

SUMMARY OF THE INVENTION

The present invention provides a retrofocus wide-angle lens system with at least the following features:

a long back focal distance compared to the focal length thereof;

an F-number of approximately 4;

a half angle-of-view of approximately 45°; and attaining a high optical quality from infinity to a closer distance.

Furthermore, the present invention also provides a wide-angle lens system which can exhibit a desirable optical quality with a small number of lens elements and has superior cost performance.

Generally, in the design of a photographing lens system, if an attempt is made to pursue compactness by reducing the thicknesses and distance between adjacent lens elements, the correcting of aberrations, such as lateral chromatic aberration and spherical aberration, becomes difficult. Namely, it is extremely difficult to achieve both a compact wide-angle lens system and high optical quality.

The present invention provides a high quality, compact lens system by appropriately selecting a lens arrangement and a glass material.

According to an aspect of the present invention, there is provided a wide-angle lens system including a negative first lens group, a negative second lens group and a positive third lens group, in this order from the object.

The negative first lens group includes a negative meniscus lens element having the convex surface facing toward the object, and a positive lens element having a convex surface facing toward the object, in this order from the object. The negative first lens group includes at least one aspherical surface.

The negative second lens group includes a negative meniscus lens element having the convex surface facing toward the object, and cemented lens elements having a positive lens element and a negative lens element, in this order from the object.

The positive third lens group includes cemented lens elements having a negative lens element and a positive lens element, and a positive lens element having a convex surface facing toward the image, in this order from the object.

The wide-angle lens system satisfies the following conditions:

$$1.30 < f3/f < 1.70 \quad (1)$$

$$-13.50 < f2/f < -3.80 \quad (2)$$

wherein f designates the focal length of the entire lens system;

f2 designates the combined focal length of the negative second lens group; and f3 designates the combined focal length of the positive third lens group.

The negative meniscus lens element having the convex surface facing toward the object of the negative first lens group preferably satisfies the following condition of the shaping factor:

$$-2.20 < SF < -1.60 \quad (3)$$

wherein $$SF = (R2 + R1)/(R2 - R1);$$

R1 designates the radius of curvature of the object-side surface of the negative meniscus lens element, in the negative first lens group, having the convex surface facing toward the object; and R2 designates the radius of curvature of the image-side surface of the negative meniscus lens element, in the negative first lens group, having the convex surface facing toward the object.

The above-explained negative meniscus lens element of the negative first lens group can be arranged to make the image-side surface aspherical. The aspherical surface can be made of glass material, or, a hybrid aspherical surface which is constituted by a layer of a synthetic resin formed over the image-side surface of the negative meniscus lens element.

With respect to condition (3), in the case of the aspherical surface, the paraxial radius of curvature of the aspherical surface is used in calculations to obtain the shaping factor (SF).

The wide-angle lens system preferably satisfies the following conditions:

$$-1.75 < fL1/f < -1.40 \quad (4)$$

$$2.90 < fL2/f < 5.90 \quad (5)$$

wherein fL1 designates the focal length of the negative meniscus lens element, in the negative first lens group, having the convex surface facing toward the object;

fL2 designates the focal length of the positive lens element, in the negative first lens group, having the convex surface facing toward the object; and f designates the focal length of the entire lens system;

Upon focusing on an object at infinity to an object at a closer distance, a front lens group constituted by the negative first lens group and the negative second lens group, and a rear lens group constituted by the positive third lens group are preferably moved independently toward the object.

In the negative first lens group, the negative meniscus lens element having the convex surface facing toward the object is preferably position at the most object-side of the negative first lens group, i.e., the most object-side lens element of the wide-angle lens system.

The present disclosure relates to subject matter contained in Japanese Patent Application No. 2008-207276 (filed on Aug. 11, 2008) which is expressly incorporated herein in its entirety.

BRIEF DESCRIPTION OF THE DRAWINGS

The present invention will be discussed below in detail with reference to the accompanying drawings, in which:

FIG. 3 shows the lens arrangement of the first embodiment of the wide-angle lens system, according to the present invention, when an object at a closer distance is in an in-focus state;

FIGS. 4A, 4B, 4C, 4D and 4E show aberrations occurred in the lens arrangement in FIG. 3;

FIG. 7 shows the lens arrangement of the second embodiment of the wide-angle lens system, according to the present invention, when an object at a closer distance is in an in-focus state;

FIGS. 8A, 8B, 8C, 8D and 8E show aberrations occurred in the lens arrangement in FIG. 7;

FIG. 9 shows a lens arrangement of a third embodiment of a wide-angle lens system, according to the present invention, when an object at infinity is in an in-focus state;

FIGS. 10A, 10B, 10C, 10D and 10E show aberrations occurred in the lens arrangement in FIG. 9;

FIG. 13 shows a lens arrangement of a fourth embodiment of a wide-angle lens system, according to the present invention, when an object at infinity is in an in-focus state;

FIGS. 14A, 14B, 14C, 14D and 14E show aberrations occurred in the lens arrangement in FIG. 13;

FIG. 15 shows the lens arrangement of the fourth embodiment of the wide-angle lens system, according to the present invention, when an object at a closer distance is in an in-focus state;

FIGS. 16A, 16B, 16C, 16D and 16E show aberrations occurred in the lens arrangement in FIG. 15;

FIG. 21 shows a lens arrangement of a sixth embodiment of a wide-angle lens system, according to the present invention, when an object at infinity is in an in-focus state;

FIGS. 22A, 22B, 22C, 22D and 22E show aberrations occurred in the lens arrangement in FIG. 21;

FIG. 27 shows the lens arrangement of the seventh embodiment of the wide-angle lens system, according to the present invention, when an object at a closer distance is in an in-focus state;

FIGS. 28A, 28B, 28C, 28D and 28E show aberrations occurred in the lens arrangement in FIG. 27;

FIG. 29 shows a lens arrangement of an eighth embodiment of a wide-angle lens system, according to the present invention, when an object at infinity is in an in-focus state;

FIGS. 30A, 30B, 30C, 30D and 30E show aberrations occurred in the lens arrangement in FIG. 29;

FIG. 31 shows the lens arrangement of the eighth embodiment of the wide-angle lens system, according to the present invention, when an object at a closer distance is in an in-focus state; and FIGS. 32A, 32B, 32C, 32D and 32E show aberrations occurred in the lens arrangement in FIG. 31.

DESCRIPTION OF THE PREFERRED EMBODIMENTS

Figure 1:
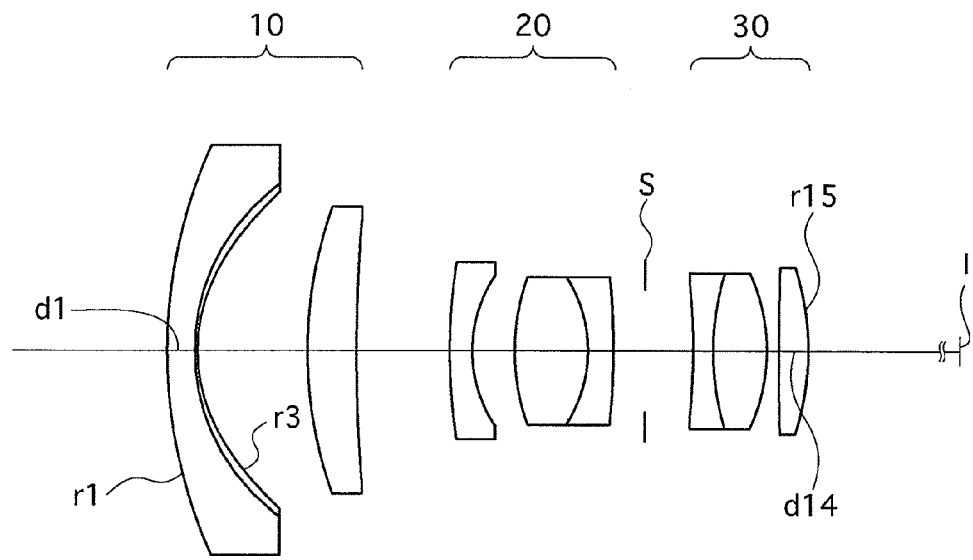
FIG. 1 shows a lens arrangement of a first embodiment of a wide-angle lens system, according to the present invention, when an object at infinity is in an in-focus state.
Figure 2A:
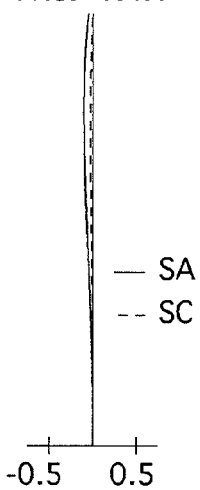
FIGS. 2A, 2B, 2C, 2D and 2E show aberrations occurred in the lens arrangement in FIG. 1.
Figure 2B:
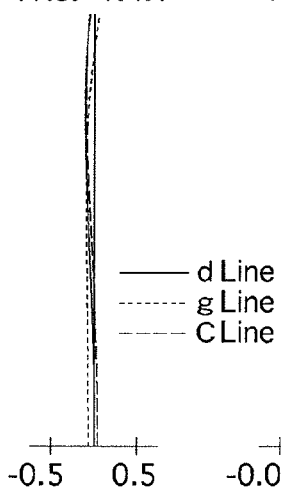
Figure 2C:
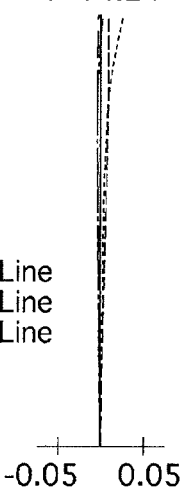
Figure 2D:
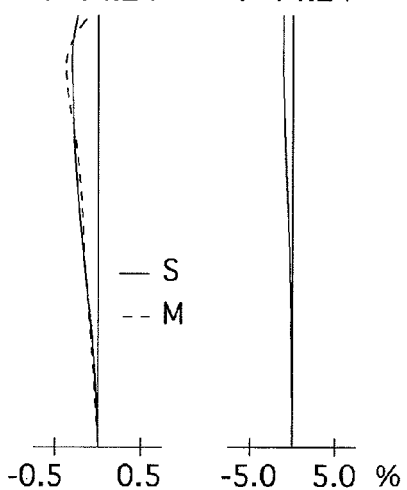
Figure 2E:
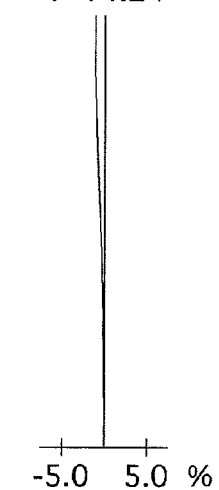

A wide-angle lens system according to the present invention, as shown in each of the embodiments of FIGS. 1 (3), 5 (7), 9 (11), 13 (15), 17 (19), 21 (23), 25 (27) and 29 (31), includes a negative first lens group 10, a negative second lens group 20, a diaphragm S, and a positive third lens group 30, in this order from the object.

'I' designates an imaging plane.

The negative first lens group 10 and the negative second lens group 20, which are provided in front (on the object side) of the diaphragm S constitute a front lens group, and the positive third lens group 30 which is provided behind (on the image side of) the diaphragm S constitutes a rear lens group. Hence, this arrangement is a retrofocus lens system having a negative front lens group and a positive rear lens group, in this order from the object.

In other words, according to the present invention, the negative front lens group is divided into the two lens groups, so that the refractive power distribution over the two lens groups (i.e., the negative first lens group 10 and the negative second lens group 20) is optimized.

The negative first lens group 10 is arranged to accept a part of the negative refractive power in the retrofocus lens system; and in each of the first through eighth embodiments, the negative first lens group 10 includes a negative meniscus lens element having the convex surface facing toward the object and a positive lens element having a convex surface facing toward the object, in this order from the object. At least one aspherical surface is provided in the negative first lens group 10.

The negative second lens group 20 is also arranged to accept the rest of the negative refractive power in the retrofocus lens system; and in each of the first through eighth embodiments, the negative second lens group 20 includes a negative meniscus lens element having the convex surface facing toward the object and cemented lens elements having a positive lens element and a negative lens element, in this order from the object. The entire cemented lens elements has a positive refractive power.

The positive third lens group 30 is arranged to accept the positive refractive power in the retrofocus lens system; and in each of the first through eighth embodiments, the positive third lens group 30 includes cemented lens elements having a negative lens element and a positive lens element, and a positive lens element having a convex surface facing toward the image, in this order from the object.

In the front lens group, which is constituted by the negative lens group of the retrofocus lens system, if a predetermined back focal distance is secured, the shorter the focal length of the entire lens system is, the more necessary it is to increase the negative refractive power of the front lens group.

Accordingly, if the lens elements are not appropriately arranged within the front lens group, off-axis aberrations, such as distortion and lateral chromatic aberration, largely occur, and it is difficult to correct these aberrations at the rear lens group.

In order to overcome this problem, the present invention optimizes the refractive power distribution and the balance of aberrations by dividing the front lens group to which the negative refractive power in the retrofocus lens system is distributed into the negative first lens group 10 and the negative second lens group 20.

Furthermore, in the negative first lens group 10, by providing the negative meniscus lens element having a strong refractive power, a part of the negative refractive power of the front lens group of the retrofocus lens system is distributed to this negative meniscus lens element; and off-axis aberrations occurred in the negative meniscus lens element is arranged to be corrected by the positive lens element behind the negative meniscus lens element.

In the negative second lens group 20, by providing the negative meniscus lens element having a strong refractive power, the rest of the negative refractive power of the front lens group of the retrofocus lens system is distributed to this negative meniscus lens element; and off-axis aberrations occurred in the negative meniscus lens element is arranged to be corrected by the cemented lens elements having the positive lens element and the negative lens element behind the negative meniscus lens element.

The positive third lens group 30 constitutes the positive lens group of the retrofocus lens system, and corrects aberrations occurred in the negative first lens group 10 and in the negative second lens group 20, while mainly correcting axial chromatic aberrations by the cemented lens elements.

In the wide-angle lens system of the present invention, upon focusing on an object at a longer distance to an object at a closer distance, the front lens group including the negative first lens group 10 and the negative second lens group 20 and being provided in front of the diaphragm S, and the rear lens group including the positive third lens group 30 being provided behind the diaphragm S, are independently moved toward the object. Due to this arrangement, focusing is carried out from infinity to a closer distance with a stable optical quality.

The diaphragm S integrally moves either with the negative second lens group 20 or with the positive third lens group 30.

Condition (1) concerns the ratio of the focal length of the positive third lens group 30 (the rear lens group of the retrofocus lens system) to the local length of the entire lens system. By satisfying condition (1), an optimal refractive power distribution over the negative second lens group 20 and the positive third lens group 30 can be attained, the back focal distance can be secured, and the correcting of aberrations can adequately be carried out.

If f3/f exceeds the upper limit of condition (1), the Petzval sum is reduced, so that the balance to achieve the uniform image between the spherical aberration and field curvature cannot be disadvantageously maintained. Moreover, if f3/f exceeds the upper limit of condition (1), the lens system becomes longer, and the lens diameter undesirably becomes larger.

If f3/f exceeds the lower limit of condition (1), the correcting of spherical aberration and the upper light-ray coma cannot be well performed, while aberration fluctuations upon focusing undesirably increases. Furthermore, the back focal distance becomes insufficiently shorter.

Condition (2) concerns the ratio of the focal length of the negative second lens group 20 (the front lens group of the retrofocus lens system) to the local length of the entire lens system. By satisfying condition (2), an optimal refractive power distribution over the negative second lens group 20 and the positive third lens group 30 can be attained, the back focal distance can be secured, and the correcting of aberrations can adequately be carried out.

If f2/f exceeds the upper limit of condition (2), the Petzval sum is reduced, so that the balance between the spherical aberration and field curvature cannot be disadvantageously maintained. Moreover, if f2/f exceeds the upper limit of condition (2), the correcting of the lower light-ray coma cannot be well performed.

If f2/f exceeds the lower limit of condition (2), the back focal distance becomes insufficiently shorter.

Condition (3) concerns the configuration (the shaping factor SF) of the negative meniscus lens element of the negative first lens group 10, i.e., the most object-side lens element of the lens system. By satisfying condition (3), the correcting of distortion and sagittal coma in this negative meniscus lens element, and productivity of the negative meniscus lens element can both be attained.

If SF exceeds the lower limit of condition (3), distortion and sagittal coma decrease; on the other hand, manufacture of the negative meniscus lens element becomes difficult.

If SF exceeds the upper limit of condition (3), manufacture of the negative meniscus lens element becomes easier; on the other hand, distortion and sagittal coma which occur in the negative meniscus lens element increase. Consequently, the correcting of such aberrations by the remainder of the lens system becomes difficult.

Conditions (4) and (5) concern the conditions for correcting distortion in a balanced manner, and conditions for achieving an adequate back focal distance.

If fL1 and fL2/f exceed the lower limit of either condition (4) or (5), the correcting of distortion becomes difficult.

If fL1 and fL2/f exceed the upper limit of either condition (4) or (5), the back focal distance becomes insufficiently shorter.

Specific numerical embodiments will be herein discussed.

In the diagrams of spherical aberration and the sine condition, SA designates spherical aberration, SC designates the sine condition.

In the diagrams of chromatic aberration (axial chromatic aberration) represented by spherical aberration, the solid line and the two types of dotted lines respectively indicate spherical aberrations with respect to the d, g and C lines.

Also, in the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

In the tables, $F_{NO}$ designates the F-number, EF designates the effective F-number Y designates the image height, f designates the focal length of the lens system, W designates the half angle-of-view (°), fB designates the back focal distance (the distance from the image-side surface of the most image-side cover glass to the image plane), r designates the radius of curvature, d designates the lens-element thickness or distance between lens elements, Nd designates the refractive index of the d-line, and νd designates the Abbe number.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}\ldots$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

Embodiment 1

FIG. 1 shows the lens arrangement of the first embodiment of a wide-angle lens system, according to the present invention, when an object at infinity is in an in-focus state. FIGS. 2A through 2E show aberrations occurred in the lens arrangement in FIG. 1.

FIG. 3 shows the lens arrangement of the first embodiment of the wide-angle lens system, when an object at a closer distance is in an in-focus state. FIGS. 4A through 4E show aberrations occurred in the lens arrangement in FIG. 3.

Table 1 shows the numerical data of the first embodiment.

The negative first lens group 10 includes a negative meniscus lens element having the convex surface facing toward the object, and a positive lens element having a convex surface facing toward the object, in this order from the object. The negative meniscus lens element is a hybrid lens element, and on the image-side surface of the negative meniscus lens element is made aspherical by a resin layer provided on the image-side surface thereof.

The negative second lens group 20 includes a negative meniscus lens element having the convex surface facing toward the object, and cemented lens elements having a positive lens element and a negative lens element, in this order from the object.

The positive third lens group 30 includes cemented lens elements having a negative lens element and a positive lens element, and a positive lens element having a convex surface facing toward the image, in this order from the object.

Upon focusing from infinity to an object at a closer distance, the negative first lens group 10 and the negative second lens group 20 integrally move toward the object, and the positive third lens group 30 moves toward object at the faster speed than that of the negative first lens group 10 and the negative second lens group 20.

The diaphragm S is provided 3.13 in front (on the object side) of the positive third lens group 30 (surface No. 11) and moves together with the positive third lens group 30 upon focusing.

TABLE 1

FNO. = 1:4.1-4.3 (FE)
f = 15.45
M = 0.000--0.142
W = 42.96
fB = 37.49-39.83

| Surf. No. | r | d | Nd | ν |
|---|---|---|---|---|
| 1 | 32.044 | 1.80 | 1.80400 | 46.6 |
| 2 | 13.372 | 0.18 | 1.52972 | 42.7 |
| 3* | 10.544 | 7.16 | | |
| 4 | 27.640 | 3.18 | 1.62004 | 36.3 |
| 5 | 103.429 | 6.11 | | |
| 6 | 35.873 | 1.50 | 1.83481 | 42.7 |
| 7 | 8.694 | 2.78 | | |
| 8 | 14.071 | 4.78 | 1.69895 | 30.1 |
| 9 | −8.787 | 1.63 | 1.80400 | 46.6 |
| 10 | −48.476 | 5.19-4.57 | | |
| 11 | −42.598 | 1.31 | 1.80518 | 25.4 |
| 12 | 17.149 | 3.51 | 1.49700 | 81.6 |
| 13 | −12.075 | 0.76 | | |
| 14 | 195.173 | 1.93 | 1.48749 | 70.2 |
| 15 | −17.739 | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 3 | −0.10 × 10 | 0.264942 × 10⁻⁴ | 0.10204 × 10⁻⁶ | −0.69952 × 10⁻⁹ |

Embodiment 2

Figures 5, 6E:
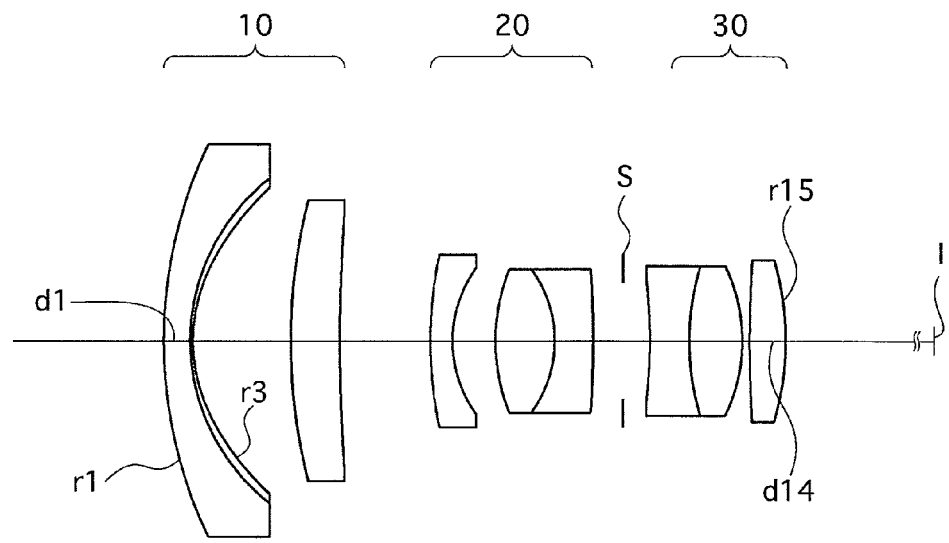
FIG. 5 shows a lens arrangement of a second embodiment of a wide-angle lens system, according to the present invention, when an object at infinity is in an in-focus state.
FIGS. 6A, 6B, 6C, 6D and 6E show aberrations occurred in the lens arrangement in FIG. 5.
Figure 6A:
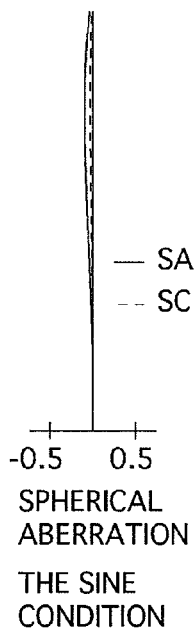
Figure 6B:
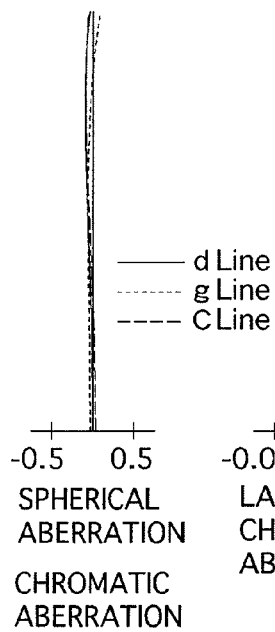
Figure 6C:
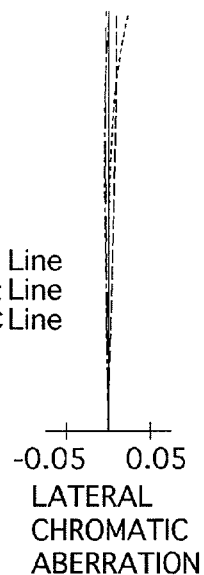
Figure 6D:
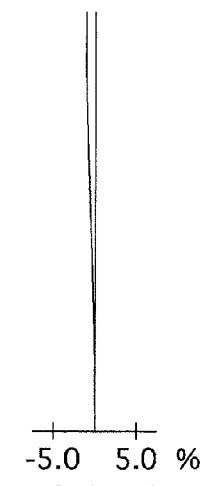

FIG. 5 shows the lens arrangement of the second embodiment of a wide-angle lens system, according to the present invention, when an object at infinity is in an in-focus state. FIGS. 6A through 6E show aberrations occurred in the lens arrangement in FIG. 5.

FIG. 7 shows the lens arrangement of the second embodiment of the wide-angle lens system, when an object at a closer distance is in an in-focus state. FIGS. 8A through 8E show aberrations occurred in the lens arrangement in FIG. 7.

Table 2 shows the numerical data of the second embodiment.

The basic lens arrangement and the focusing operation of the second embodiment are the same as that of the first embodiment.

The diaphragm S is provided 1.79 in front (on the object side) of the positive third lens group 30 (surface No. 11) and moves together with the positive third lens group 30 upon focusing.

TABLE 2

FNO. = 1:4.1-4.3 (FE)
f = 15.44
M = 0.000--0.142
W = 42.97
fB = 37.48-39.83

| Surf. No. | r | d | Nd | ν |
|---|---|---|---|---|
| 1 | 29.989 | 1.80 | 1.80400 | 46.6 |
| 2 | 13.730 | 0.18 | 1.52972 | 42.7 |
| 3* | 10.799 | 6.64 | | |
| 4 | 38.129 | 3.29 | 1.62004 | 36.3 |
| 5 | 126.230 | 5.99 | | |
| 6 | 26.788 | 1.50 | 1.83481 | 42.7 |
| 7 | 8.372 | 2.87 | | |
| 8 | 12.947 | 4.00 | 1.69895 | 30.1 |
| 9 | −8.000 | 2.56 | 1.80400 | 46.6 |
| 10 | −73.840 | 3.81-3.23 | | |
| 11 | −34.945 | 2.66 | 1.80518 | 25.4 |
| 12 | 17.287 | 3.56 | 1.49700 | 81.6 |
| 13 | −11.406 | 0.50 | | |
| 14 | 89.976 | 2.43 | 1.48749 | 70.2 |
| 15 | −19.083 | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 3 | $-0.10 \times 10$ | $0.28912 \times 10^{-4}$ | $0.50448 \times 10^{-7}$ | $-0.55809 \times 10^{-9}$ |

Embodiment 3

FIG. 9 shows the lens arrangement of the third embodiment of a wide-angle lens system, according to the present invention, when an object at infinity is in an in-focus state. FIGS. 10A through 10E show aberrations occurred in the lens arrangement in FIG. 9.

Figure 11:
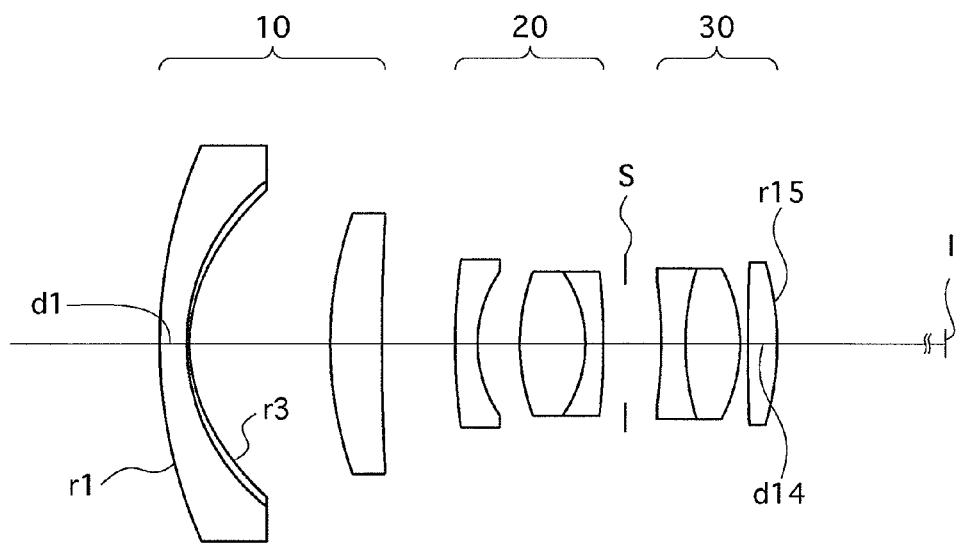
FIG. 11 shows the lens arrangement of the third embodiment of the wide-angle lens system, according to the present invention, when an object at a closer distance is in an in-focus state.
Figures 12A, 12B, 12C, 12D, 12E:
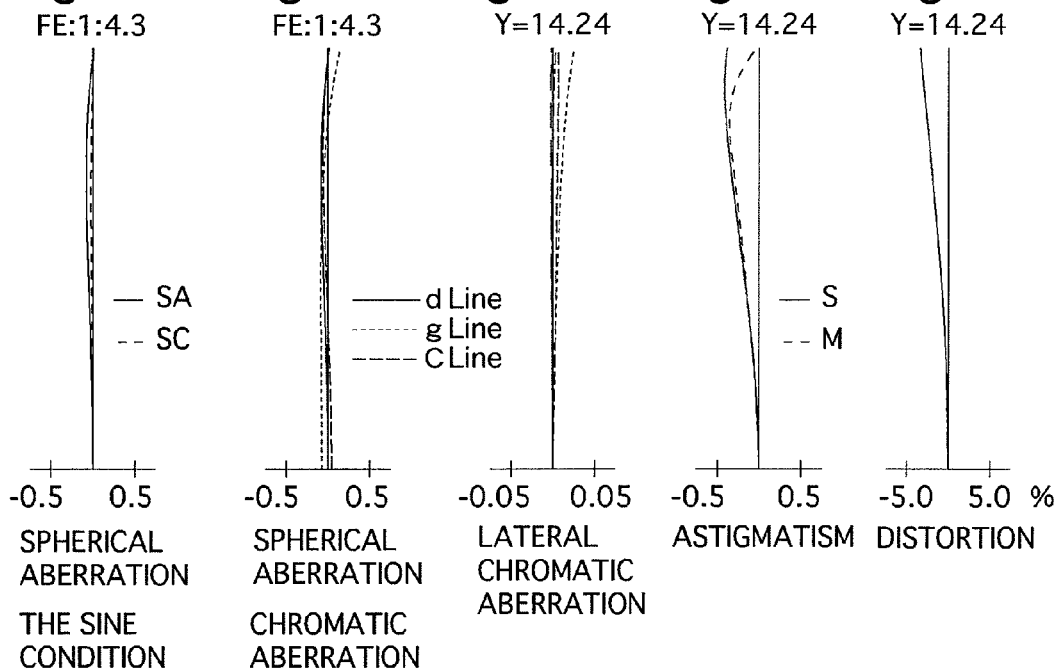
FIGS. 12A, 12B, 12C, 12D and 12E show aberrations occurred in the lens arrangement in FIG. 11.

FIG. 11 shows the lens arrangement of the third embodiment of the wide-angle lens system, when an object at a closer distance is in an in-focus state. FIGS. 12A through 12E show aberrations occurred in the lens arrangement in FIG. 11.

Table 3 shows the numerical data of the third embodiment.

The basic lens arrangement and the focusing manner of the third embodiment is the same as that of the first embodiment.

The diaphragm S is provided 2.44 in front (on the object side) of the positive third lens group 30 (surface No. 11) and moves together with the positive third lens group 30 during a focusing operation.

TABLE 3

FNO. = 1:4.1-4.3 (FE)
f = 15.45
M = 0.000--0.141
W = 42.96
fB = 37.50-39.78

| Surf. No. | r | d | Nd | ν |
|---|---|---|---|---|
| 1 | 32.580 | 1.80 | 1.80400 | 46.6 |
| 2 | 13.730 | 0.18 | 1.52972 | 42.7 |
| 3* | 10.829 | 9.39 | | |
| 4 | 26.117 | 3.39 | 1.62004 | 36.3 |
| 5 | 143.440 | 4.91 | | |
| 6 | 39.274 | 1.50 | 1.83481 | 42.7 |
| 7 | 8.369 | 2.85 | | |
| 8 | 13.553 | 4.39 | 1.69895 | 30.1 |
| 9 | −8.287 | 1.20 | 1.80400 | 46.6 |
| 10 | −43.580 | 4.46-3.87 | | |
| 11 | −30.549 | 1.62 | 1.80518 | 25.4 |
| 12 | 17.040 | 3.65 | 1.49700 | 81.6 |
| 13 | −10.875 | 0.52 | | |
| 14 | 139.650 | 1.96 | 1.48749 | 70.2 |
| 15 | −18.907 | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 3 | $-0.10 \times 10$ | $0.27663 \times 10^{-4}$ | $0.70178 \times 10^{-7}$ | $-0.46659 \times 10^{-9}$ |

Embodiment 4

FIG. 13 shows the lens arrangement of the fourth embodiment of a wide-angle lens system, according to the present invention, when an object at infinity is in an in-focus state. FIGS. 14A through 14E show aberrations occurred in the lens arrangement in FIG. 13.

FIG. 15 shows the lens arrangement of the fourth embodiment of the wide-angle lens system, when an object at a closer distance is in an in-focus state. FIGS. 16A through 16E show aberrations occurred in the lens arrangement in FIG. 15.

Table 4 shows the numerical data of the fourth embodiment.

The basic lens arrangement and the focusing operation of the fourth embodiment is the same as that of the first embodiment.

The diaphragm S is provided 2.26 in front (on the object side) of the positive third lens group 30 (surface No. 11) and moves together with the positive third lens group 30 during a focusing operation.

TABLE 4

FNO. = 1:4.1-4.3 (FE)
f = 15.45
M = 0.000--0.141
W = 42.97
fB = 37.32-39.61

TABLE 4-continued

| Surf. No. | r | d | Nd | ν |
|---|---|---|---|---|
| 1 | 32.507 | 1.80 | 1.80400 | 46.6 |
| 2 | 13.730 | 0.18 | 1.52972 | 42.7 |
| 3* | 10.831 | 9.71 | | |
| 4 | 24.183 | 3.54 | 1.62004 | 36.3 |
| 5 | 159.532 | 4.29 | | |
| 6 | 45.796 | 1.50 | 1.83481 | 42.7 |
| 7 | 8.282 | 2.62 | | |
| 8 | 13.404 | 4.62 | 1.69895 | 30.1 |
| 9 | −8.351 | 1.20 | 1.80400 | 46.6 |
| 10 | −41.893 | 4.28-3.69 | | |
| 11 | −30.605 | 1.67 | 1.80518 | 25.4 |
| 12 | 17.021 | 3.88 | 1.49700 | 81.6 |
| 13 | −10.971 | 0.50 | | |
| 14 | 157.825 | 2.22 | 1.48749 | 70.2 |
| 15 | −18.246 | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 3 | $-0.10 \times 10$ | $0.28895 \times 10^{-4}$ | $0.51674 \times 10^{-7}$ | $-0.41668 \times 10^{-9}$ |

Embodiment 5

Figure 17:
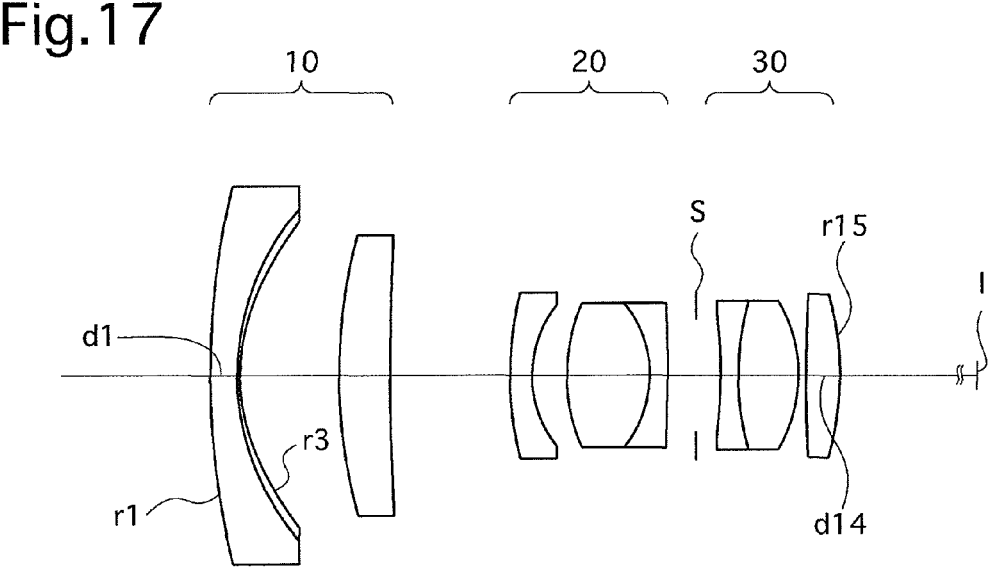
FIG. 17 shows a lens arrangement of a fifth embodiment of a wide-angle lens system, according to the present invention, when an object at infinity is in an in-focus state.
Figures 18A, 18B, 18C, 18D, 18E:
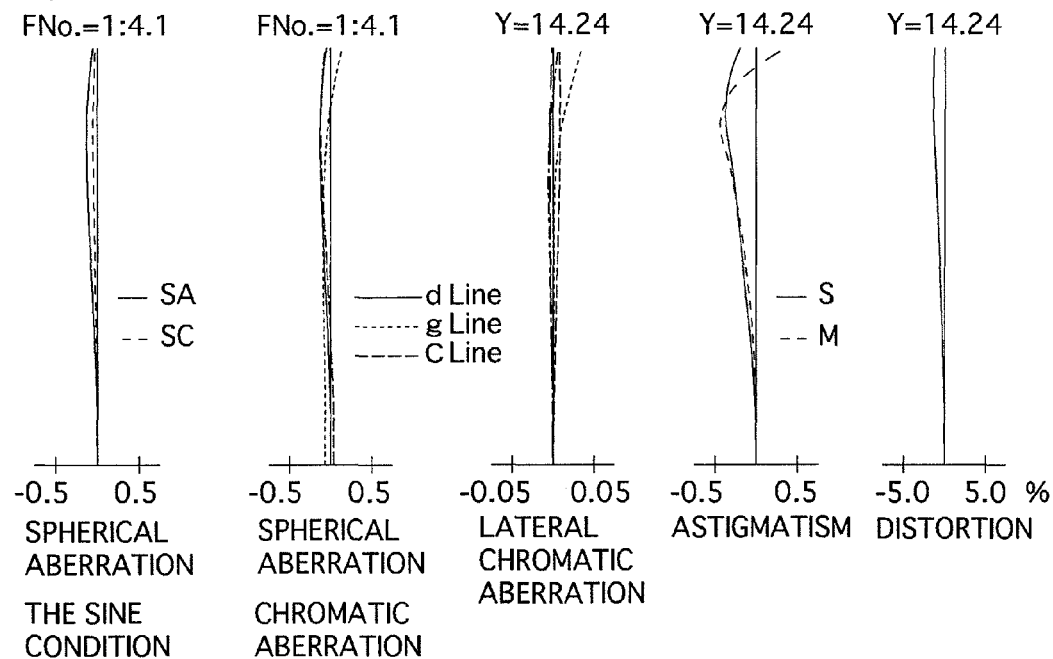
FIGS. 18A, 18B, 18C, 18D and 18E show aberrations occurred in the lens arrangement in FIG. 17.

FIG. 17 shows the lens arrangement of the fifth embodiment of a wide-angle lens system, according to the present invention, when an object at infinity is in an in-focus state. FIGS. 18A through 18E show aberrations occurred in the lens arrangement in FIG. 17.

Figure 19:
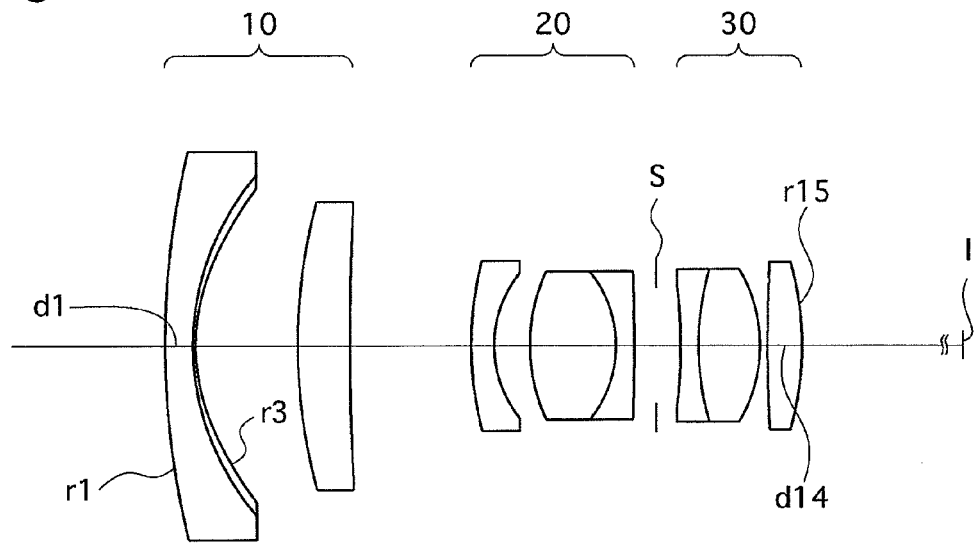
FIG. 19 shows the lens arrangement of the fifth embodiment of the wide-angle lens system, according to the present invention, when an object at a closer distance is in an in-focus state.
Figures 20A, 20B, 20C, 20D, 20E:
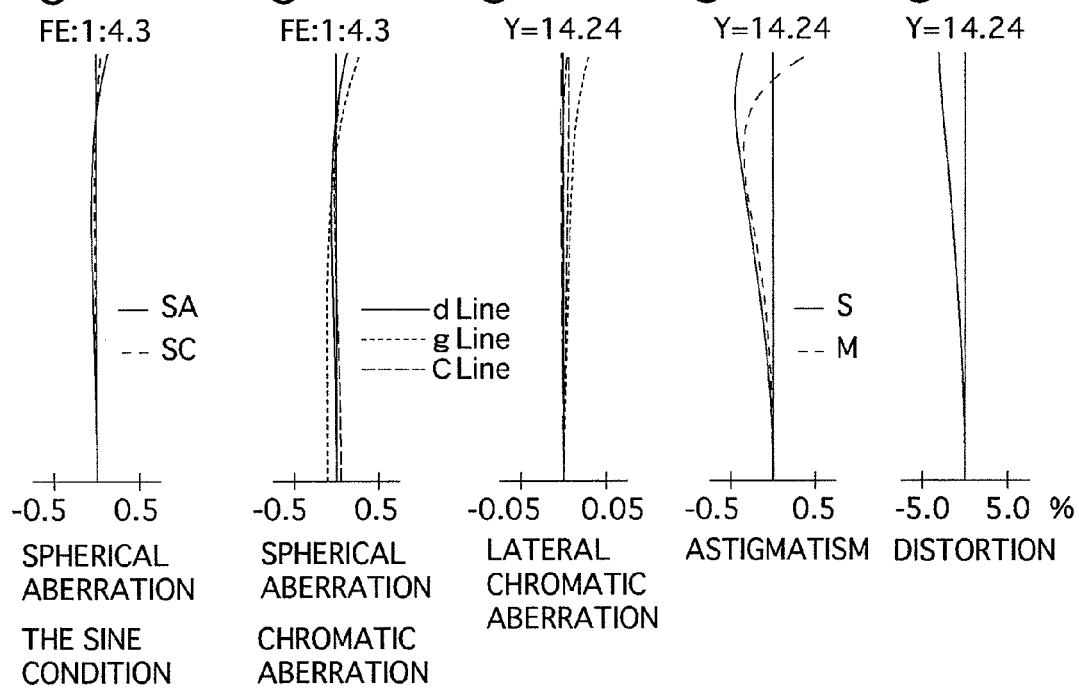
FIGS. 20A, 20B, 20C, 20D and 20E show aberrations occurred in the lens arrangement in FIG. 19.

FIG. 19 shows the lens arrangement of the fifth embodiment of the wide-angle lens system, when an object at a closer distance is in an in-focus state. FIGS. 20A through 20E show aberrations occurred in the lens arrangement in FIG. 19.

Table 5 show a fifth embodiment of a wide-angle lens system according to the present invention.

The diaphragm S is provided 1.65 in front (on the object side) of the positive third lens group 30 (surface No. 11) and moves together with the positive third lens group 30 upon focusing.

TABLE 5

FNO. = 1:4.1-4.3 (FE)
f = 15.45
M = 0.000--0.142
W = 43.00
fB = 36.82-39.26

| Surf. No. | r | d | Nd | ν |
|---|---|---|---|---|

TABLE 5-continued

| 1 | 54.598 | 1.80 | 1.80400 | 46.6 |
|---|---|---|---|---|
| 2 | 17.000 | 0.18 | 1.52972 | 42.7 |
| 3* | 12.976 | 6.75 | | |
| 4 | 35.818 | 3.43 | 1.72825 | 28.5 |
| 5 | 176.567 | 8.00 | | |
| 6 | 22.396 | 1.50 | 1.83481 | 42.7 |
| 7 | 7.583 | 2.37 | | |
| 8 | 11.878 | 5.61 | 1.68893 | 31.1 |
| 9 | −7.674 | 1.20 | 1.80400 | 46.6 |
| 10 | −138.141 | 3.62-3.08 | | |
| 11 | −32.577 | 1.20 | 1.80518 | 25.4 |
| 12 | 17.940 | 4.07 | 1.49700 | 81.6 |
| 13 | −9.786 | 0.50 | | |
| 14 | 101.239 | 2.27 | 1.48749 | 70.2 |
| 15 | −20.455 | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 3 | $-0.10 \times 10$ | $-0.67707 \times 10^{-6}$ | $-0.52774 \times 10^{-7}$ | $0.10969 \times 10^{-10}$ |

Embodiment 6

FIG. 21 shows the lens arrangement of the sixth embodiment of a wide-angle lens system, according to the present invention, when an object at infinity is in an in-focus state. FIGS. 22A through 22E show aberrations occurred in the lens arrangement in FIG. 21.

Figure 23:
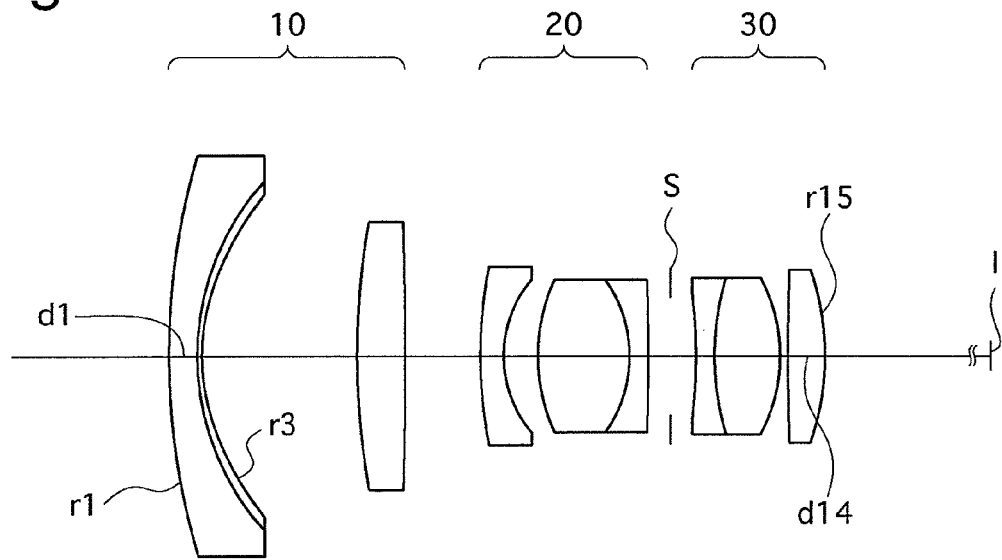
FIG. 23 shows the lens arrangement of the sixth embodiment of the wide-angle lens system, according to the present invention, when an object at a closer distance is in an in-focus state.
Figures 24A, 24B, 24C, 24D, 24E:
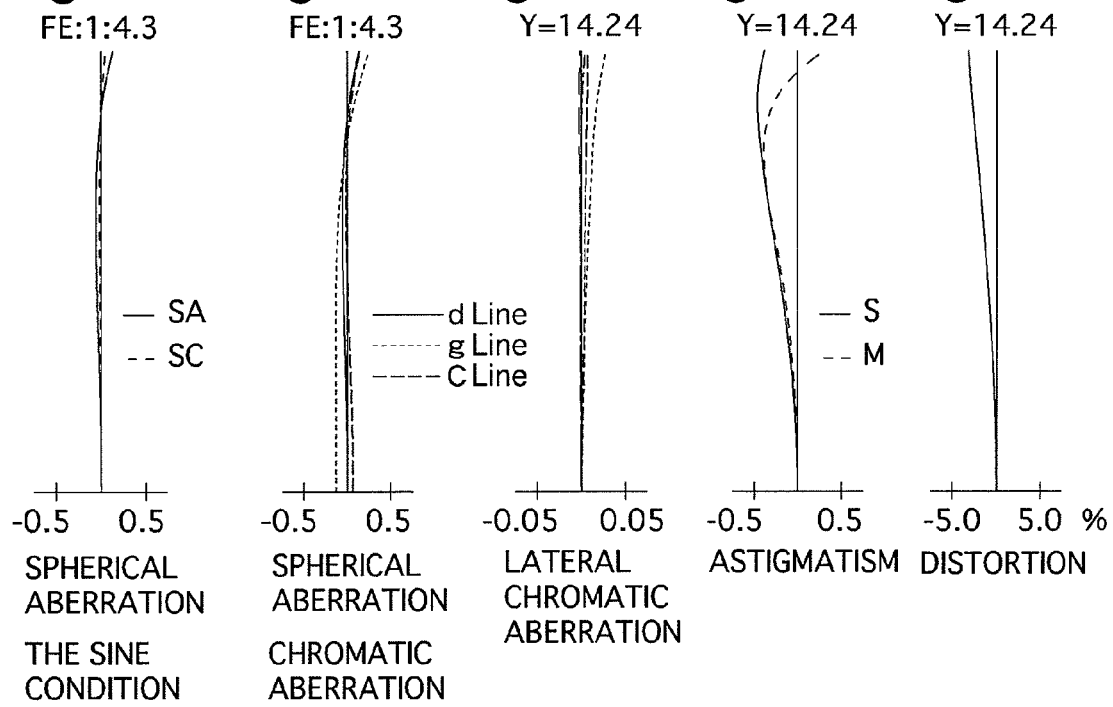
FIGS. 24A, 24B, 24C, 24D and 24E show aberrations occurred in the lens arrangement in FIG. 23.

FIG. 23 shows the lens arrangement of the sixth embodiment of the wide-angle lens system, when an object at a closer distance is in an in-focus state. FIGS. 24A through 24E show aberrations occurred in the lens arrangement in FIG. 23.

Table 6 shows the numerical data of the sixth embodiment.

The negative first lens group 10 and the negative second lens group 20 separately (independently) move toward the object when focusing is being performed from infinity to an object at a closer distance.

The basic lens arrangement and the focusing operation of the sixth embodiment is the same as that of the first embodiment.

The diaphragm S is provided 1.64 in front (on the object side) of the positive third lens group 30 (surface No. 11) and moves together with the positive third lens group 30 upon focusing.

TABLE 6

FNO. = 1:4.1-4.3 (FE)
f = 15.45
M = 0.000--0.142
W = 43.05
fB = 36.82-39.25

| Surf. No. | r | d | Nd | ν |
|---|---|---|---|---|
| 1 | 44.992 | 1.80 | 1.80400 | 46.6 |
| 2 | 16.570 | 0.30 | 1.52972 | 42.7 |
| 3* | 13.219 | 9.93 | | |
| 4 | 47.979 | 3.09 | 1.69895 | 30.1 |
| 5 | −300.000 | 4.78 | | |
| 6 | 28.417 | 1.50 | 1.80400 | 46.6 |

TABLE 6-continued

| | | | | |
|---|---|---|---|---|
| 7 | 7.561 | 2.18 | | |
| 8 | 11.592 | 5.84 | 1.68893 | 31.1 |
| 9 | −8.378 | 1.20 | 1.80400 | 46.6 |
| 10 | −141.137 | 3.61-3.04 | | |
| 11 | −33.296 | 1.20 | 1.80518 | 25.4 |
| 12 | 17.252 | 4.20 | 1.49700 | 81.6 |
| 13 | −10.470 | 0.50 | | |
| 14 | 175.318 | 2.36 | 1.48749 | 70.2 |
| 15 | −17.054 | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 3 | −0.10 × 10 | 0.50565 × 10$^{-5}$ | −0.40680 × 10$^{-7}$ | 0.13730 × 10$^{-11}$ |

Embodiment 7

Figure 25:
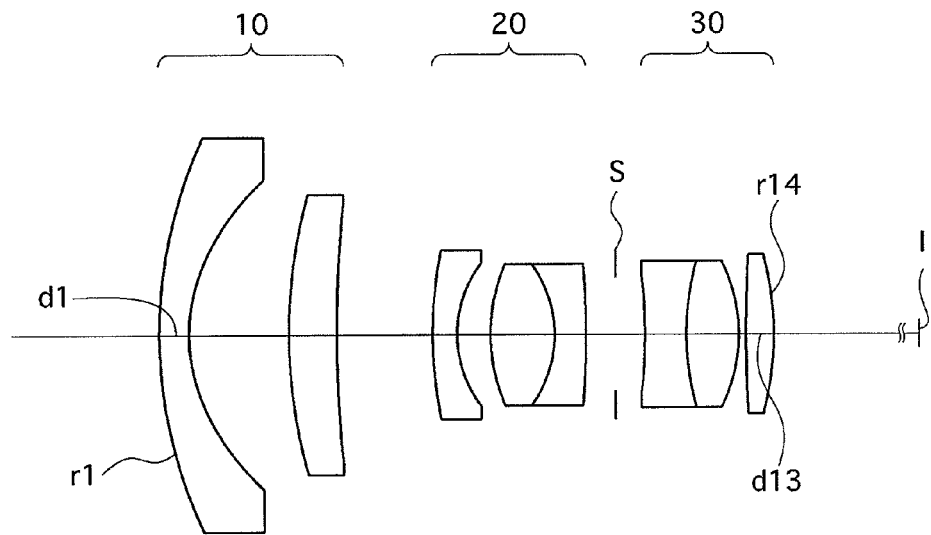
FIG. 25 shows a lens arrangement of a seventh embodiment of a wide-angle lens system, according to the present invention, when an object at infinity is in an in-focus state.
Figures 26A, 26B, 26C, 26D, 26E:
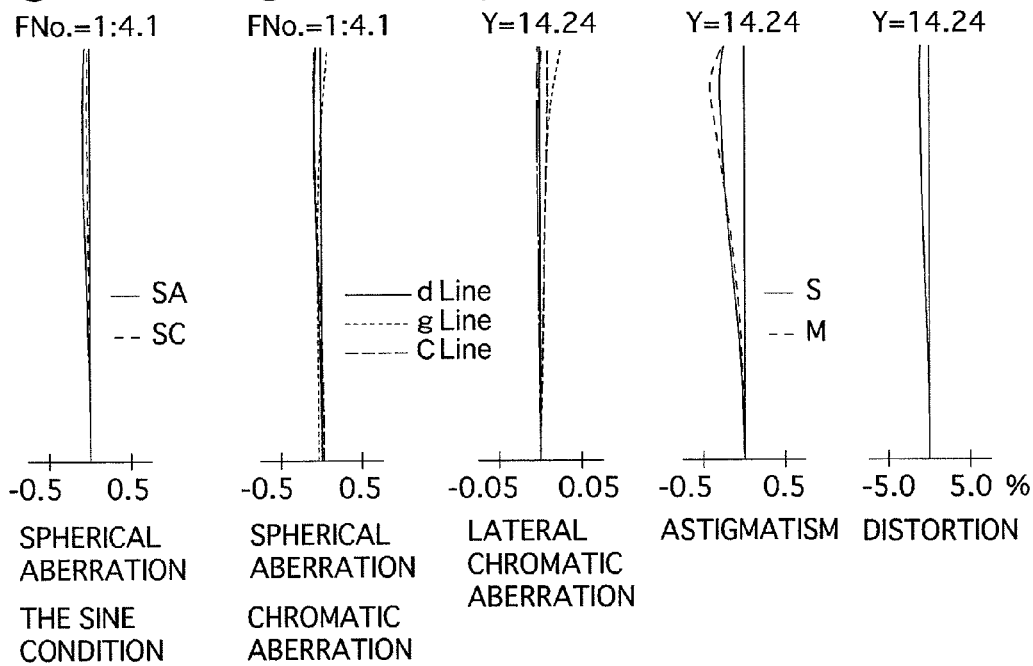
FIGS. 26A, 26B, 26C, 26D and 26E show aberrations occurred in the lens arrangement in FIG. 25.

FIG. 25 shows the lens arrangement of the seventh embodiment of a wide-angle lens system, according to the present invention, when an object at infinity is in an in-focus state. FIGS. 26A through 26E show aberrations occurred in the lens arrangement in FIG. 25.

FIG. 27 shows the lens arrangement of the seventh embodiment of the wide-angle lens system, when an object at a closer distance is in an in-focus state. FIGS. 28A through 28E show aberrations occurred in the lens arrangement in FIG. 27.

Table 7 shows the numerical data of the seventh embodiment.

The basic lens arrangement and the focusing operation of the seventh embodiment is the same as that of the first embodiment except that the most object-side negative meniscus lens element is constituted by a glass aspherical lens element, i.e., an aspherical resin layer is not employed.

The diaphragm S is provided 1.99 in front (on the object side) of the positive third lens group 30 (surface No. 10) at the infinite photographic distance, and provided 1.40 in front (on the object side) of positive the third lens group 30 (surface No. 10) at the minimum photographic distance.

The diaphragm S moves together with the negative second lens group 20 upon focusing.

TABLE 7

FNO. = 1:4.1-4.4 (FE)
f = 15.45
M = 0.000--0.142
W = 42.98
fB = 37.50-39.85

| Surf. No. | r | d | Nd | ν |
|---|---|---|---|---|
| 1 | 31.772 | 1.98 | 1.80400 | 46.6 |
| 2* | 11.914 | 6.86 | | |
| 3 | 34.971 | 3.25 | 1.62004 | 36.3 |
| 4 | 89.137 | 6.56 | | |
| 5 | 28.402 | 1.68 | 1.83481 | 42.7 |
| 6 | 8.068 | 2.25 | | |
| 7 | 12.247 | 4.30 | 1.69895 | 30.1 |
| 8 | −8.245 | 2.11 | 1.80400 | 46.6 |

TABLE 7-continued

| | | | | |
|---|---|---|---|---|
| 9 | −57.332 | 4.02-3.43 | | |
| 10 | −32.876 | 2.82 | 1.80518 | 25.4 |
| 11 | 18.318 | 3.58 | 1.49700 | 81.6 |
| 12 | −10.956 | 0.50 | | |
| 13 | 93.650 | 1.91 | 1.48749 | 70.2 |
| 14 | −20.253 | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 2 | −0.10 × 10 | 0.33375 × 10$^{-4}$ | 0.40119 × 10$^{-7}$ | 0.50837 × 10$^{-10}$ |

Embodiment 8

FIG. 29 shows the lens arrangement of the eighth embodiment of a wide-angle lens system, according to the present invention, when an object at infinity is in an in-focus state. FIGS. 30A through 30E show aberrations occurred in the lens arrangement in FIG. 29.

FIG. 31 shows the lens arrangement of the eighth embodiment of the wide-angle lens system, when an object at a closer distance is in an in-focus state. FIGS. 32A through 32E show aberrations occurred in the lens arrangement in FIG. 31.

Table 8 shows the numerical data of the eighth embodiment.

The basic lens arrangement and the focusing operation of the eighth embodiment is the same as that of the seventh embodiment.

The diaphragm S is provided 1.63 in front (on the object side) of the positive third lens group 30 (surface No. 10) at the infinite photographic distance, and provided 1.10 in front (on the object side) of the positive third lens group 30 (surface No. 10) at the minimum photographic distance.

The diaphragm S moves together with the negative second lens group 20 upon focusing.

TABLE 8

FNO. = 1:4.1-4.4 (FE)
f = 15.45
M = 0.000--0.141
W = 43.05
fB = 36.82-39.28

| Surf. No. | r | d | Nd | ν |
|---|---|---|---|---|
| 1 | 61.956 | 1.80 | 1.80400 | 46.6 |
| 2* | 14.683 | 5.19 | | |
| 3 | 34.196 | 3.71 | 1.72825 | 28.5 |

TABLE 8-continued

| | | | | |
|---|---|---|---|---|
| 4 | 151.703 | 8.76 | | |
| 5 | 20.983 | 1.50 | 1.83481 | 42.7 |
| 6 | 7.368 | 2.64 | | |
| 7 | 12.276 | 5.57 | 1.68893 | 31.1 |
| 8 | −7.794 | 1.20 | 1.80400 | 46.6 |
| 9 | −153.334 | 3.58–3.06 | | |
| 10 | −36.275 | 1.26 | 1.80518 | 25.4 |
| 11 | 17.436 | 4.09 | 1.49700 | 81.6 |
| 12 | −9.777 | 0.50 | | |
| 13 | 124.043 | 2.26 | 1.48749 | 70.2 |
| 14 | −20.178 | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 2 | $-0.10 \times 10$ | $0.45031 \times 10^{-5}$ | $-0.13514 \times 10^{-7}$ | $0.20840 \times 10^{-10}$ |

The numerical values of each condition for each embodiment are shown in Table 9.

TABLE 9

| | Embod. 1 | Embod. 2 | Embod. 3 | Embod. 4 | Embod. 5 |
|---|---|---|---|---|---|
| Cond. (1) | 1.59 | −10.14 | −1.98 | −1.48 | 3.88 |
| Cond. (2) | 1.53 | −11.74 | −2.13 | −1.61 | 5.63 |
| Cond. (3) | 1.63 | −8.90 | −2.00 | −1.52 | 3.30 |
| Cond. (4) | 1.61 | −6.53 | −2.00 | −1.53 | 2.95 |
| Cond. (5) | 1.39 | −4.58 | −1.62 | −1.56 | 3.95 |
| Cond. (6) | 1.40 | −3.81 | −1.83 | −1.72 | 3.84 |
| Cond. (7) | 1.53 | −13.50 | −2.20 | −1.61 | 5.87 |
| Cond. (8) | 1.36 | −3.98 | −1.62 | −1.58 | 3.87 |

As can be understood from Table 9, the first through eighth embodiments satisfy conditions (1) through (5). Furthermore, as can be understood from the aberration diagrams, the various aberrations are suitably corrected.

According to the present invention, a retrofocus wide-angle lens system with at least the following features can be attained:

a long back focal distance compared to the focal length thereof;

an F-number of approximately 4;

a half angle-of-view of approximately 45°; and attaining a high optical quality from infinity to a closer distance.

Furthermore, according to the present invention, a wide-angle lens system which can exhibit a desirable optical quality with a small number of lens elements and has superior cost performance can be attained.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A wide-angle lens system comprises a negative first lens group, a negative second lens group and a positive third lens group, in this order from an object, wherein said negative first lens group comprises a negative meniscus lens element having the convex surface facing toward the object, and a positive lens element having a convex surface facing toward the object, in this order from the object;

wherein said negative first lens group comprises at least one aspherical surface;

wherein said negative second lens group comprises a negative meniscus lens element having the convex surface facing toward the object, and cemented lens elements having a positive lens element and a negative lens element, in this order from the object;

wherein said positive third lens group comprises cemented lens elements having a negative lens element and a positive lens element, and a positive lens element having a convex surface facing toward the image, in this order from the object; and wherein said wide-angle lens system satisfies following conditions:

$$1.30 < f3/f < 1.70$$

$$-13.50 < f2/f < -3.80$$

wherein f designates the focal length of the entire lens system;

f2 designates the combined focal length of said negative second lens group; and f3 designates the combined focal length of said positive third lens group.

2. The wide-angle lens system according to claim 1, wherein said negative meniscus lens element of said negative first lens group satisfies the following condition of the shaping factor:

$$-2.20 < SF < -1.60$$

wherein $$SF = (R2+R1)/(R2-R1);$$

R1 designates the radius of curvature of the object-side surface of said negative meniscus lens element of said negative first lens group; and R2 designates the radius of curvature of the image-side surface of said negative meniscus lens element of said negative first lens group.

3. The wide-angle lens system according to claim 2, wherein the image-side surface of said negative meniscus lens element of said negative first lens group is made aspherical; and wherein the paraxial radius of curvature of said aspherical surface is used in calculations to obtain the shaping factor.

4. The wide-angle lens system according to claim 2, wherein the image-side surface of said negative meniscus lens element having the convex surface facing toward the object, in said negative first lens group, comprises a hybrid aspherical surface formed by a layer of a synthetic resin provided over the image-side surface of said negative meniscus lens element; and wherein the paraxial radius of curvature of said aspherical surface is used in calculations to obtain the shaping factor.

5. The wide-angle lens system according to claim 1, satisfying the following conditions:

$$-1.75 < fL1/f < -1.40$$

$$2.90 < fL2/f < 5.90$$

wherein fL1 designates the focal length of said negative meniscus lens element, in said negative first lens group, having the convex surface facing toward the object;

fL2 designates the focal length of said positive lens element, in said negative first lens group, having the convex surface facing toward the object; and f designates the focal length of the entire lens system.

6. The wide-angle lens system according to claim 1, wherein upon focusing from infinity to an object at a closer distance, a front lens group comprising said negative first lens group and said negative second lens group, and a rear lens group comprising said positive third lens group are moved independently toward the object.

7. The wide-angle lens system according to claim 1, wherein said negative meniscus lens element, of said negative first lens group, having the convex surface facing toward the object is position at the most object-side in the negative first lens group.

* * * * *